United States Patent [19]

Motojima et al.

[11] 4,017,583

[45] Apr. 12, 1977

[54] VOLITILIZATION PROCESS FOR SEPARATION OF MOLYBDENUM-99 FROM IRRADIATED URANIUM

[75] Inventors: Kenji Motojima, Mito; Matae Iwasaki, Ibaragi; Kazuya Suzuki, Ibaragi; Yoshihide Komaki, Ibaragi; Katsuaki Ichiyanagi, Tokyo, all of Japan

[73] Assignee: Japan Atomic Energy Research Institute, Tokyo, Japan

[22] Filed: Jan. 31, 1975

[21] Appl. No.: 546,120

[30] Foreign Application Priority Data

Feb. 7, 1974 Japan .............................. 49-14930

[52] U.S. Cl. .................................. 423/2; 423/19; 423/59; 423/249; 423/260
[51] Int. Cl.² ......................................... C01G 39/00
[58] Field of Search ............... 423/2, 19, 249, 606, 423/59, 260; 252/301.1 R

[56] References Cited

UNITED STATES PATENTS

| | | | |
|---|---|---|---|
| 1,815,132 | 7/1931 | Schwarzkopf | 423/606 X |
| 3,148,941 | 9/1964 | Gers | 423/260 X |
| 3,208,815 | 9/1965 | Bourgeois et al. | 423/260 X |
| 3,343,924 | 9/1967 | Anastasia et al. | 423/260 X |
| 3,745,119 | 7/1973 | Arino et al. | 252/301.1 R |
| 3,752,769 | 8/1973 | Lewis et al. | 252/301.1 R |
| 3,830,746 | 8/1974 | Brown et al. | 423/2 X |

OTHER PUBLICATIONS

Shiryaeva et al., N.S.A., 26 (No. 8), p. 1671, abs. No. 17620, (Apr. 1972).

Primary Examiner—Edward A. Miller
Attorney, Agent, or Firm—Browdy and Neimark

[57] ABSTRACT

A novel process and an apparatus are herein disclosed for separating molybdenum-99 from irradiated uranium.

7 Claims, 1 Drawing Figure

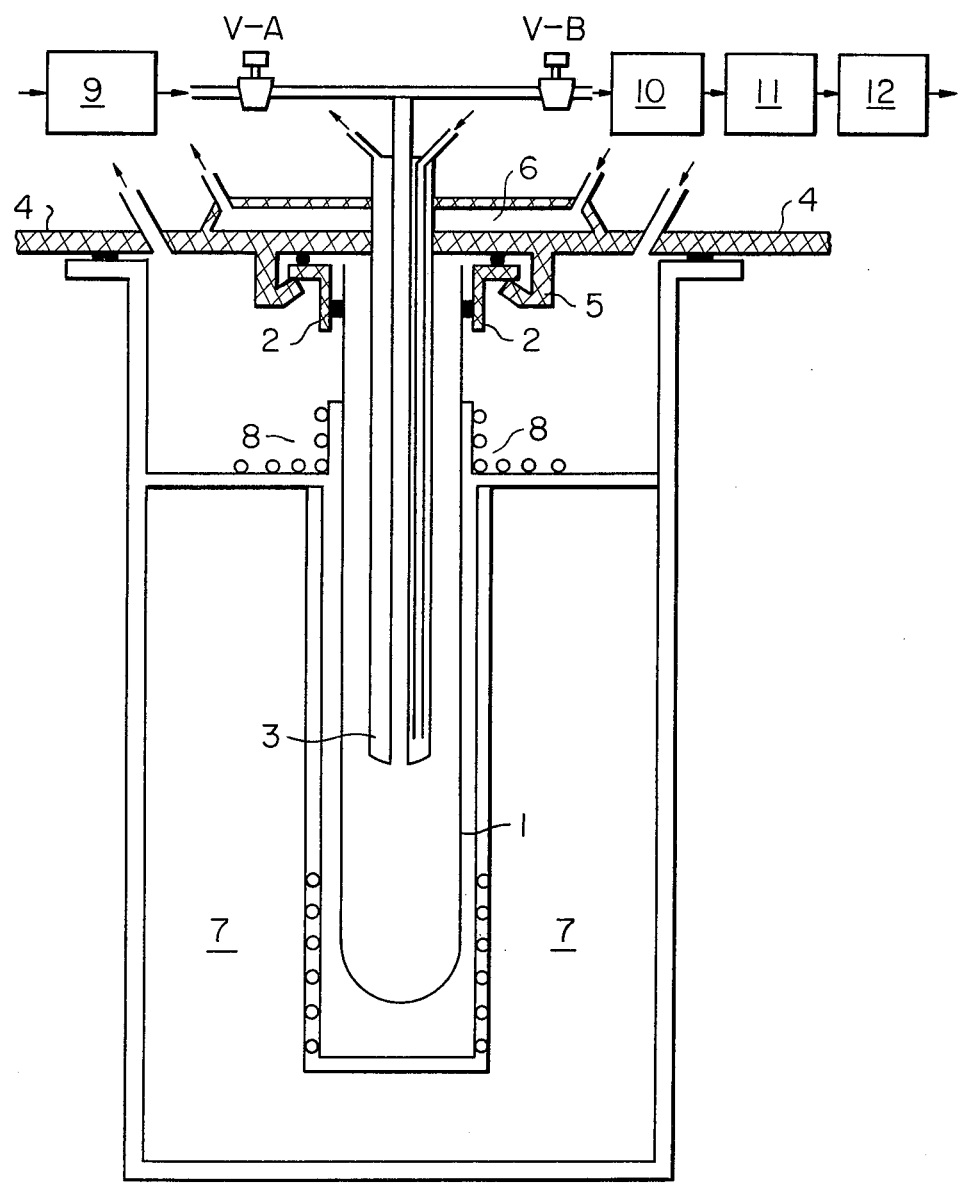

VOLITILIZATION PROCESS FOR SEPARATION OF MOLYBDENUM-99 FROM IRRADIATED URANIUM

BACKGROUND OF THE INVENTION

1. Field of the Invention

The present invention relates to a process for separating molybdenum-99 from neutron-irradiated uranium and also to an apparatus therefor.

2. Description of Prior Art

Molybdenum-99 is produced either by neutron irradiation of molybdenum-98, which constitutes about 25% of the natural molybdenum isotopes, or by fission of uranium-235. The former process is more often used, but in this case, to obtain molybdenum-99 of the high specific activity required for practical use, molybdenum-98 should be irradiated under the condition of thermal neutron flux higher than $10^{14}$n/cm$^2$.sec.

In the latter process, by irradiating uranium under the condition of lower neutron flux around $10^{13}$n/cm$^2$.sec, molybdenum-99 can be produced at a relatively high fission yield of about 6% and the obtained molybdenum-99 is almost in carrier free state. In this case, however, because of the presence of fission products other than molybdenum-99, the radioactivity of neutron irradiated uranium becomes extremely high, and accordingly, it is technologically very difficult to separate from such highly radioactive uranium rapidly the pharmaceutically acceptable molybdenum-99, the half life of which is as short as 67.0 hours, and recover the same in a high yield.

The methods of separating molybdenum-99 from irradiated uranium are currently known to be commercially applicable; one is "solvent extraction" (see R. E. Lewis. International Journal of Applied Radiation and Isotopes, 22, 603–605, 1971) and the other is the process described in Japanese Patent Public Disclosure No. 16095/73 which is characterized by coprecipitating the molybdenum with α-benzoinoxim in the form of its complex. But from the viewpoints of maintenance, safety and economy, neither method is fully acceptable. First of all, not a few steps such as precipitation, filtration and extraction should be taken after irradiated uranium is dissolved, and secondly, these steps are not only cumbersome but they result in a great amount of radioactive wastes in liquid form.

As explained in the foregoing paragraphs, the conventional methods for producing molybdenum-99 have many defects to be eliminated, so a process and an apparatus that produces molybdenum-99 in fewer steps more rapidly and safely has been desired for many years by those skilled in the art.

The present inventors, focusing upon the sublimation property of molybdenum trioxide (MoO$_3$), have carried out serious research on the conditions suitable for the sublimation and separation of molybdenum-99 from irradiated uranium, and as a result, they have developed a process and an apparatus for separating the molybdenum more conveniently, rapidly and safely.

BRIEF SUMMARY OF INVENTION

Therefore, one of the objects of this invention is to provide a novel process for producing molybdenum-99 of high specific activity in a high yield.

Another object of this invention is to provide a novel process for separating molybdenum-99 from fission products.

A further object of this invention is to provide a process and an apparatus for separating molybdenum-99 from neutron-irradiated uranium by vacuum sublimation.

A still further object of this invention is to provide a process, and an apparatus therefor, for separating and collecting molybdenum-99 from neutron-irradiated uranium through heating said uranium in an atmosphere of oxygen of negative pressure, followed by heating at elevated temperature in vacuo, and sublimating molybdenum-99.

The other objects and advantages of this invention will become more apparent from the following description and accompanying drawings.

BRIEF DESCRIPTION OF THE DRAWING

The attached FIGURE is an outline of one specific example of the apparatus according to the present invention.

DETAILED DESCRIPTION OF THE INVENTION:

This invention relates to a process for separating molybdenum-99 from thermal neutron irradiated uranium by vacuum sublimation technique; it also relates to an apparatus for working such process.

Molybdenum-99 is a parent nuclide of technetium-99 which is the nuclide most widely used in preparing several medical agents applicable for scintigraphic diagnosis of diseases such as brain cancer.

First of all, we describe the apparatus which is to be used to work this invention in accordance with the attached drawing.

In this drawing, 1 is a heat resistant reaction vessel made of fused silica, alumina, ceramics, etc. and it is hermetically supported on a stainless steel fixed board 4 by means of a conventional clamping method.

Numbered 3 is a cylindrical stainless steel tube (collector) for collecting molybdenum. Said tube is so constructed that a cooling medium such as air or cooled carbonated gas can be charged into it from the side tube positioned at its upper portion.

A heat generator is provided at the bottom of a vertical type tubular electric furnace 7. The furnace is also equipped with a heat shielding board 8 that may be cooled with water.

V-A and V-B are valves that can be opened or closed either magnetically or electrically.

9 is a pressure regulator for gas introduced;
10 is a means for collecting iodine;
11 is a means for collecting xenon; and
12 is a vacuum pump.

From the technical and economical point of view, micro pellets of 2–3% enriched uranium dioxide, which are most widely employed as a fuel for commercial nuclear power plants are the most desirable substance to be used as a target for irradiation of this invention. Needless to say, the more highly enriched the uranium, the smaller the amount which is necessary to operate the process of this invention. Said process is not inoperable with natural uranium. Moreover, other uranium compounds, metals or alloys can also be employed in this invention if they are converted to uranium oxides by suitable treatment after their irradiation. As an alternative, a small amount of molybdenum may be added to the target as its carrier.

To describe the principle of this invention briefly, neutron-irradiated uranium dioxide pellets are charged into a heat resistant vessel 1 in which has been made a vacuum by a vacuum pump, and then heated to 400°–700° C in an atmosphere of oxygen. Uranium dioxide is quantitatively oxidized to powdered triuranium octoxide ($U_3O_8$). By this oxidation reaction, not only do the pellets completely lose their original shapes and are rendered powdered but also their crystal structure is changed, and therefore fission products which have been maintained within the crystal of uranium dioxide are emitted; for example, xenon and iodine evaporate at this stage. Keeping the pressure of oxygen at subatmospheric pressure is most desirable for preventing the leakage of these fission products and mildly promoting the oxidizing reaction. Molybdenum is also oxidized at this stage and changed to sublimable molybdenum trioxide.

When oxidation is completed and oxygen is discharged from the vessel by means of a vacuum pump, radioactive gases such as xenon and iodine must be collected so that none of them may escape from the reaction system. Since oxygen is the main gas contained in the system, it is easy to entrap and recover such radioactive gases.

Triuranium octoxide is heated to more than 1000° C under vacuum. At 1150° C, molybdenum sublimes at a considerably high rate and deposits on the tip of the collector. The collected molybdenum is dissolved in a solvent such as an aqueous ammonia, and impurities are removed by chemical procedure. The nuclides that accompany the molybdenum are ruthenium 103, tellerium 132 and their daughter nuclides, and the intensity of their radioactivity has decreased to about one tenth of theirinitial activity.

In the pages that follow, we explain the present invention in more detail by working examples.

EXAMPLE 1

Irradiated uranium dioxide pellets were placed on the bottom of a silica reaction vessel 1, which was sealed by being supported on a fixed board 4 via a clamping metal fixture 2. An electric furnace was lifted to a suitable position.

A vacuum pump was actuated by closing a valve V-A and opening a valve V-B; when the entire reaction system was rendered vacuum, the valve V-B was closed. The valve V-A was opened to introduce oxygen gas into the reaction system through a pressure regulator 9. The presence of oxygen was adjusted to the range of 1/5 to ½ atmospheric pressure. The system was heated with the electric furnace 7 to a temperature of about 600° C until oxygen was no longer consumed. When the reaction was completed, the valve V-A was closed and the valve V-B was opened to make the system vacuum again. Caution was exercised not to let iodine and xenon go outside the reaction system by collecting them on the collectors 10 and 11.

The inside of the furnace was heated to around 1200° C where most of the molybdenum trioxide sublimed in about one hour. The sublimated molybdenum collected on the furthermost end of the collector 3 which had been cooled to about 700° C. After standing to cool, the electric furnace was lowered to render the reaction system to be under atmospheric pressure, and thereafter the reaction vessel 1 was unfastened with no time lost in placing a cover on it, and was discarded as it was accomodated in a shielding vessel.

Molybdenum trioxide which deposited on the farthermost end of the collector could be easily dissolved in ammonia in the following manner:

A small amount of dilute aqueous ammonia was charged into a glass vessel having the same shape as that of the reaction vessel. The glass vessel was mounted on the fixed board in the same way as was the reaction vessel. It was mildly heated at its bottom. The collector was brought down to room temperature by some means, for example, water cooling. Evaporating aqueous ammonia condensed on the surface of the collection tube and fell dropwise as it dissolved molybdenum. By this procedure, a small amount of molybdenum was recovered as aqueous solution.

The procedure mentioned above needs to be carried out within a lead cell with walls more than 25 cm in thickness, but after the molybdenum is dissolved in an aqueous ammonia, its purification can be effected in a cell with less thick walls, for example, with walls about 10 cm in thickness.

According to this working example, it needs only about one hour to oxidize 150 g of the pellets of uranium dioxide, and the volume of triuranium octoxide resulting from the oxidation is such that it stands about 3 cm high in a reaction tube having a diameter of 5 cm. After heating the collection tube about one hour, more than 90% of the molybdenum located at the lowest bottom of the reaction vessel is recovered.

EXAMPLE 2

A sample of 150% of 3% enriched uranium dioxide pellets was exposed to a thermal neutron flux of $3 \times 10^{13} n/cm^2.sec$ for three days, allowed to cool for the same period of time, separated and purified in a day; the recovery yield of molybdenum was 80%, and the amount of molybdenum obtained was about 45 cc.

We have hereinbefore explained the present invention by two specific examples, but it should be understood that these working examples are by no means meant to limit this invention and that many modifications and variations can be made without departing from the spirit and scope of the claims so far as they relate to the process and apparatus therefor of the present invention. To take one example of such modification, instead of setting up the iodine collector, xenon collector and vacuum pump on the same line as shown in the attached drawing, the collectors may form a different line from that of the pump.

By the foregoing explanation, the many advantages of this invention over the conventional techniques are made clear. But the inventors wish to stress the following three advantages of this invention.

We claim:
1. A process for separating and collecting molybdenum-99 in the form of molybdenum trioxide from neutron-irradiated, uranium, comprising:
   heating the neutron-irradiated uranium in an atmosphere of oxygen under sub-atmospheric pressure to a temperature sufficient to oxidize the uranium to powdered triuranium octoxide,
   heating the formed triuranium octoxide in vacuo to a temperature sufficient to sublimate molybdenum-99 in the form of molybdenum trioxide, and
   condensing the sublimated molybdenum-99 in the form of molybdenum trioxide on a collector.
2. A process in accordance with claim 1 wherein said step of heating the neutron-irradiated uranium is to a temperature of 400°–700° C.

3. A process in accordance with claim 1 wherein said step of heating the formed triuranium octoxide is to a temperature greater than 1000° C.

4. A process in accordance with claim 3 wherein said step of heating the neutron-irradiated uranium is under a pressure of 1/5 to ½ atmospheric.

5. A process in accordance with claim 1 further including the step of: after said step of heating the neutron-irradiated uranium and before said step of heating the formed triuranium octoxide, evacuating from the atmosphere any released fission products.

6. A process in accordance with claim 5 wherein said evacuating step comprises evacuating and trapping xenon and iodine.

7. A process in accordance with claim 1 wherein said condensing step is carried out on a collector cooled to about 700° C.

* * * * *